United States Patent Office 2,961,306
Patented Nov. 22, 1960

2,961,306

1,2-DIAMINOCYCLOHEXANE TETRACETIC ACID AS H₂O₂ STABILIZER

Peter R. Johnston, Corpus Christi, Tex., assignor to Columbia-Southern Chemical Corporation, Allegheny County, Pa., a corporation of Delaware No Drawing. Filed Apr. 1, 1958, Ser. No. 725,504

2 Claims. (Cl. 23—207.5)

This invention relates to stabilization of hydrogen peroxide.

It is known that sodium stannate exerts a stabilizing effect upon aqueous hydrogen peroxide solutions. In some cases, the presence of this material has an adverse effect upon the reaction and/or the character of the product which is obtained. For these reasons, among others, it is advantageous to provide hydrogen peroxide solutions which are stabilized either partially or wholly by organic stabilizers.

The problem of obtaining organic stabilizers is complicated by the fact that hydrogen peroxide reacts with organic compounds. Moreover, many organic compounds not only do not stabilize but actually serve to increase the decomposition rate of hydrogen peroxide.

According to the present invention, it has been found that hydrogen peroxide may be stabilized effectively by adding thereto a small amount of 1,2-diaminocyclohexane tetracetic acid. This material has the general formula:

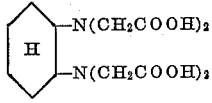

The amount of 1,2-diaminocyclohexane tetracetic acid which can be used usually ranges from about 0.001 to 1 percent by weight. In most cases, the amount used is in excess of about 25 parts by weight per million parts of hydrogen peroxide solution, and the best results usually are achieved when the amount ranges between 100 to 500 parts of the 1,2-diaminocyclohexane tetracetic acid per million parts by weight of hydrogen peroxide solution.

Solutions of any convenient hydrogen peroxide content may be stabilized in this way. However, for most purposes, hydrogen peroxide solutions containing from 10 to 80 percent by weight of H₂O₂ are used. While hydrogen peroxide solutions containing 90 percent or more by weight of H₂O₂ may be stabilized using this material, it is rather comon to use such solutions without stabilizers.

In a typical series of experiments, pint glass bottles were filled with an aqueous hydrogen peroxide solution containing 50 percent by weight of H₂O₂ containing small amounts of carbonaceous impurities produced in the course of generation of the hydrogen peroxide. The hydrogen peroxide used was prepared by the so-called "autoxidation process" involving alternate hydrogenation of 2-ethyl anthraquinone in organic solvent and in the presence of palladium catalyst, followed by oxidation of the resulting quinol and extraction of the aqueous hydrogen peroxide.

To each of the bottles of hydrogen peroxide solution was added 179 milligrams per liter of sodium pyrophosphate (Na₄P₂O₇.10H₂O). To three of the bottles was added, respectively, 50, 100, and 250 milligrams per liter of 1,2-diaminocyclohexane tetracetic acid. These bottles were then stored at ambient temperatures which ranged from 75 to 95° F. for a period of 3 months. Periodically during this time, the stability of the hydrogen peroxide was measured by heating each of the solutions to 50° C. and measuring the decomposition rate per hour at this temperature. The following table illustrates the results obtained.

| Material Added | Amount, Milligrams per liter | Decomposition Rate in Percent of Hydrogen Peroxide Decomposed per hour at 50° C. | | | | Average Decomposition, percent/day During Storage for 3 months |
|---|---|---|---|---|---|---|
| | | After 1 week | After 1 month | After 2 months | After 3 months | |
| 1,2-diaminocyclohexane tetracetic acid | 50 | 0.0001 | 0.0002 | 0.0001 | 0.0002 | <0.0001 |
| Do | 100 | .0001 | .0001 | .0002 | .0001 | <.0001 |
| Do | 250 | .0001 | .0001 | .0002 | .0001 | <.0001 |

From the above data, it appears clear that 1,2-diaminocyclohexane tetracetic acid is as effective a stabilizer as sodium stannate.

While in the above example sodium pyrophosphate was introduced into the solution, this is not a necessary component and may be omitted if desired. Alternatively, other stabilizers, both inorganic and organic, may be added to the hydrogen peroxide containing the 1,2-diaminocyclohexane tetracetic acid, if desired. Moreover, the same results are achieved when hydrogen peroxide of other concentrations is subjected to stabilization.

Although the present invention has been described with reference to the specific details of certain embodiments, it is not intended that such details shall be construed to limit the scope of the invention except insofar as included in the accompanying claims.

What is claimed:

1. Aqueous hydrogen peroxide containing a small stabilizing amount of 1,2-diaminocyclohexane tetracetic acid.

2. The aqueous hydrogen peroxide of claim 1 wherein the concentration of 1,2-diaminocyclohexane tetracetic acid ranges from 0.001 to 1 percent by weight.

References Cited in the file of this patent

FOREIGN PATENTS 731,238     Great Britain _____ June 1, 1955

OTHER REFERENCES

Martell et al.: "Chemistry of the Metal Chelate Compounds," 1952, pp. 493–495, 536.